Nov. 28, 1961 A. ROTH 3,010,440
INTERNAL COMBUSTION ENGINE WITH DOUBLE ACTING PISTONS
Filed Dec. 15, 1958 4 Sheets-Sheet 1
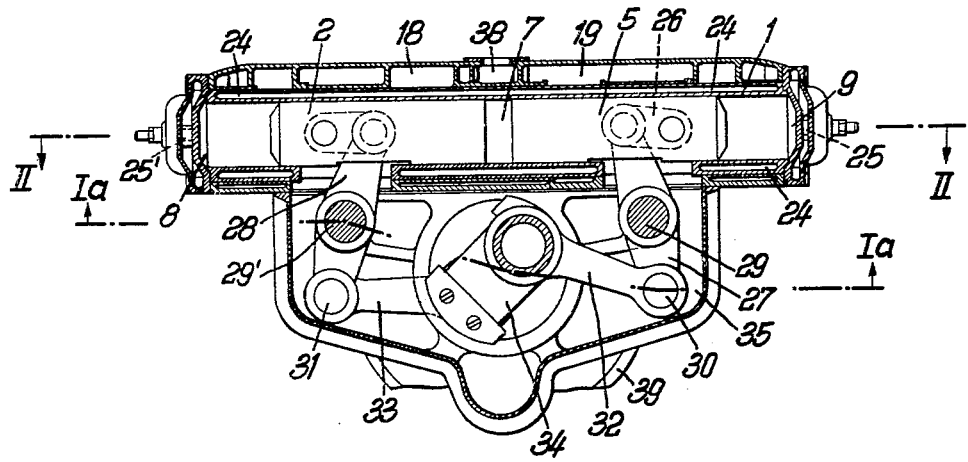
Inventor:
Adolf Roth Nov. 28, 1961 A. ROTH 3,010,440
INTERNAL COMBUSTION ENGINE WITH DOUBLE ACTING PISTONS
Filed Dec. 15, 1958 4 Sheets-Sheet 2
*Fig. 1a*
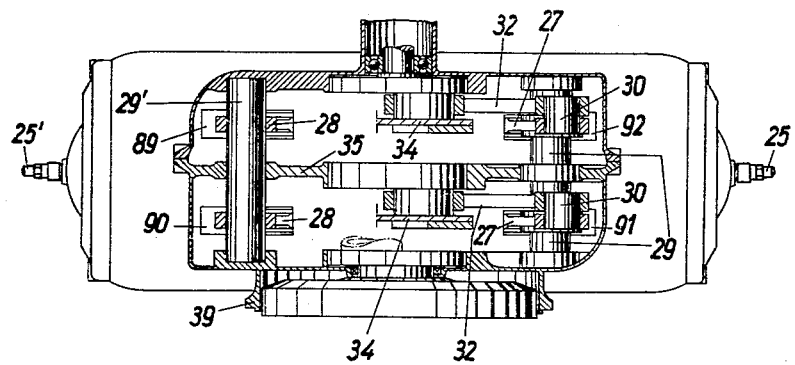
*Fig. 6*          *Fig. 7*
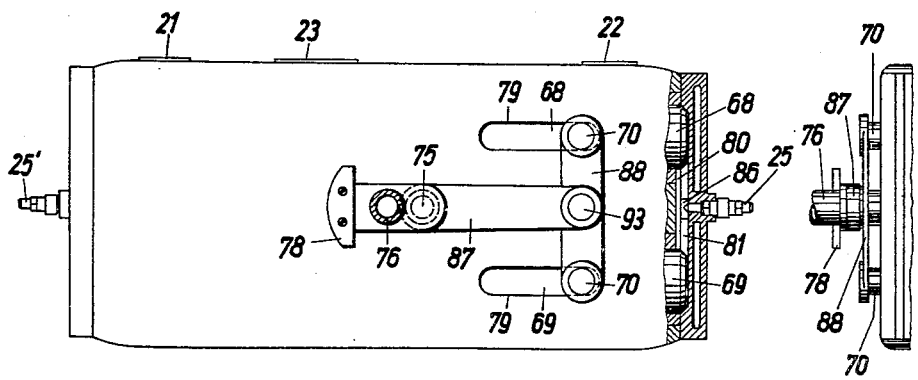
Inventor:
Adolf Roth
By
Patent Agent Nov. 28, 1961 A. ROTH 3,010,440
INTERNAL COMBUSTION ENGINE WITH DOUBLE ACTING PISTONS
Filed Dec. 15, 1958 4 Sheets-Sheet 3

Inventor:
Adolf Roth

United States Patent Office 3,010,440
Patented Nov. 28, 1961

3,010,440
INTERNAL COMBUSTION ENGINE WITH
DOUBLE ACTING PISTONS
Adolf Roth, Kaupenstrasse 58, Essen, Germany
Filed Dec. 15, 1958, Ser. No. 780,533
Claims priority, application Germany Dec. 18, 1957
3 Claims. (Cl. 123—51)

The present invention relates to internal combustion engines with double acting pistons. Internal combustion engines are known in which each cylinder has reciprocably mounted therein two double acting pistons. With this type of internal combustion engines, there is provided a combustion chamber between each two pistons, and there is also provided a combustion chamber between each piston and the adjacent cylinder head. The combustion chamber confined by both pistons has automatically a piston displacement which is twice the piston displacement of the combustion chamber confined by one of the pistons and the adjacent cylinder head. It will, therefore, be obvious that the combustion chamber between the two pistons, which may be called the inner combustion chamber requires twice as much fuel as the combustion chamber between a piston and the adjacent piston head, which may be called the outer combustion chamber. To this end, with an ordinary fuel injection pump, two pump cylinders are required for the supply of the inner combustion chamber with fuel. Furthermore, the said inner combustion chamber may, with a slot-controlled engine be scavenged uni-directionally and may be supercharged if the two pistons are operated at a certain phase displacement. On the other hand, however, the outer combustion chamber can be provided with transverse scavenging or reverse scavenging only and cannot be supercharged unless special movable auxiliary means such as a slide are arranged in cooperation with the slots, or controlled valves or non-controlled check valves are arranged in the cylinder head for uniflow scavenging for which purpose a considerable number of additional parts and also considerable additional service is required.

It is, therefore, an object of the present invention to provide an internal combustion engine with double acting pistons which will overcome the above mentioned drawbacks.

It is another object of this invention to provide an internal combustion engine with double acting pistons, in which the combustion chambers will receive substantially the same quantity of fuel.

It is a further object of this invention to provide an internal combustion engine of the above mentioned type, which is very versatile and relatively simple in construction and inexpensive in production.

These and other objects and advantages of the invention will appear more clearly from the following specification in connection with the accompanying drawings, in which:

FIG. 1 is a vertical section through an engine according to the present invention provided with two straight-line cylinder parts and four combustion chambers, said section being taken along the line I—I of FIG. 2 while the crank drive is sectioned ahead of the plane indicated by the section line I—I.

FIG. 1a is a section along the line Ia—Ia of FIG. 1.

FIG. 2 is a section along the line II—II of FIG. 1.

FIGS. 6 and 7 illustrate respectively in top view and side view a modified engine according to the present invention.

General arrangement

Figure 3:
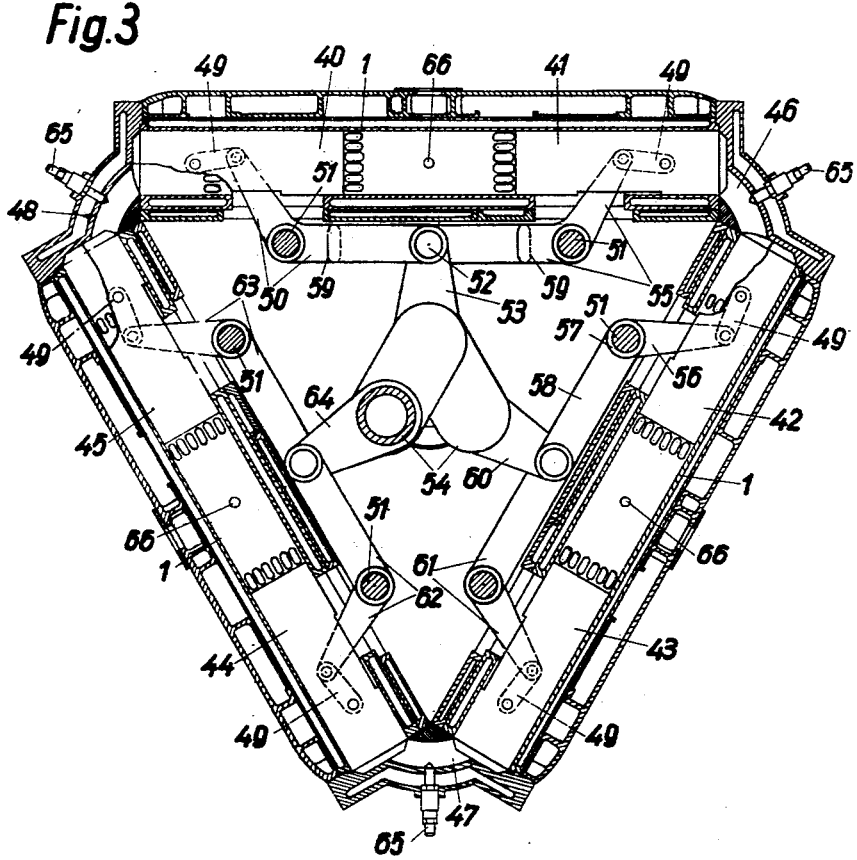
FIG. 3 is a vertical section through a modified internal combustion engine according to the present invention with three straight-line cylinder parts and six combustion chambers, the section through the driving mechanism being located in front of the sectional plane through the cylinder axes.

The internal combustion engine according to the present invention is so designed that each cylinder has two pistons moving in opposite direction toward and away from each other and confining a combustion chamber therebetween.

Such engine may be so designed that a cylinder comprises four pistons which confine four combustion chambers two of which are so designed that the cylinder consists of an annular chamber closed in itself with two straight parallel sections and two short corner adjoining sections. All of the combustion chambers will then have a uniform displacement and, consequently, the same quantity of fuel will have to be injected into each of the combustion chambers. Furthermore, each combustion chamber will be confined by two pistons of which each time one piston may control the inlet slots while the other piston controls the outlet slots so that each combustion chamber can be scavenged in uni-flow and that with a corresponding phase displacement of the pistons, each combustion chamber can be supercharged without additionally moved auxiliary means. This supercharging may be effected preferably by means of an exhaust gas turbine.

In order to be able to obtain the maximum free cross section for the passage of the gas while employing a corner compression chamber, it is suggested, in conformity with the present invention to provide a recess which passes through a portion of the upper wall separating adjacent chambers of the same cylinder so that the free cross section for the passage of the gases will not be located in the cylinder head or will not be confined to the cylinder head only. The balancing levers which may be designed in form of bell crank levers are connected to the pistons through short links. The axis of the connecting bolt between the link and the piston may intersect the cylinder axis at a right angle but more expediently may be arranged adjacent the cylinder axis in such a way that the greatest forces will confine the smallest angle with the cylinder axis so that the lateral forces acting upon the piston will be kept at a minimum.

Each connecting rod may convey its forces between the piston and stationary pivot for the balancing lever. This arrangement may be advantageous with engines the cylinders of which have more than two straight-lined sections, since in such an instance at the corners always two balancing levers can be linked to a stationary pivot. There is, however, a certain difficulty with such an arrangement which difficulty consists in that with a given piston stroke, the crank shaft stroke will be rather short and consequently the link forces will be very high. It is, of course, to be understood that such a cylinder may also be provided with valves in such a way that the combustion chambers will work in a four-stroke cycle. More expediently, the cycles will then be distributed over the combustion chambers in such a way that not only a uniform ignition sequence will be obtained with each rotation of the crankshaft but also maximum portions of the gas forces will be conveyed through the pistons directly upon the charge in the adjacent combustion chamber so that these forces will not act upon the crank drive. Cylinders according to the present invention may be equally well employed in connection with the diesel method as well as in connection with the Otto method.

Structural arrangement

Referring now to the drawings in detail and FIGS. 1 and 2 thereof in particular, the arrangement comprises a cylinder, the straight-line parts of which are designated with the reference numeral 1. In each of the two straight-line parts 1 there are reciprocally mounted two pistons 2 and 5, and 3 and 4 which confine therebetween four combustion chambers 6, 7, 8 and 9. As will be seen from the drawings, the two combustion chambers 6 and 7 are straight, whereas the two combustion chambers 8 and 9 include a somewhat U-shaped portion. The combustion chamber 8 is provided with outlet slots 10, whereas the combustion chamber 6 is provided with outlet slots 11. Similarly, the combustion chamber 6 is provided with inlet slots 12, whereas the combustion chamber 9 is provided with outlet slots 13. The combustion chamber 9 furthermore has inlet slots 14, while the combustion chamber 7 has inlet slots 15 and outlet slots 16. The inlet slots of the combustion chamber 8 are designated with the numeral 17. As will be evident from the drawings, the outlet slots 11 and 16 lead into an exhaust gas chamber 18 common thereto. The inlet slots 12, 14 and 15 lead into a chamber 19 common thereto which communicates with a chamber 20 communicating with the inlet slots 17. The outlet slots 10 and 13 are through the respective annular chambers associated therewith in communication with the exhaust gas connections 21 and 22 respectively, whereas the annular chamber 18 communicates with the exhaust gas conection 23. The cylinder is surrounded by a cooling jacket 24. The combustion chambers 8 and 9 have associated therewith two injection nozzles 25, 25' respectively. The pistons 2 and 5 are respectively through an oscillating ling 26, 26' (see FIG. 1) connected to one end of two-arm levers 27, 28 which extend through cylinder openings 89 and 92 and are tiltably journalled on pivots 29, 29' respectively, whereas the other ends of levers 27, 28 are by means of pivots 30, 31 linked to connecting rods 32 and 33 respectively. The connecting rods 32 and 33 are journalled on cranks of a crank shaft 34. Pivot 29' is clearly shown on the left side of FIG. 1a and is located in the plane along which the section shown in FIG. 1a has been taken. Pivot 29 which is visible on the right-hand side of FIG. 1a is located behind said last mentioned plane. The connecting rods 32 are located in the said plane but have not been sectioned. Crankshaft 34 is sectioned so that only the two cranks are visible on which the connecting rods 32 are journalled.

Pistons 3 and 4 are by means of further oscillating levers, two-arm levers and connecting rods connected with two further cranks of the crankshaft 34, said cranks being located behind the housing wall 35. The combustion chambers 6 and 7 are provided with fuel injection nozzles 36 and 37 respectively. The reference numeral 38 designates a connection for connecting the cooling jacket 24 with a water cooler (not shown in the drawings). The reference numeral 39 designates a connecting flange to which the transmission housing is to be connected.

Operation of embodiment of FIGS. 1 and 2

The arrangement of FIGS. 1 and 2 operates in the following manner. When pistons 2 and 3 are by means of their crank drive moved in the direction towards their inner dead centers in combustion chambers 6 and 7, simultaneously, pistons 4 and 5 will through the crank drive be moved in the direction toward their inner dead center points in combustion chambers 6 and 7. Consequently, a compression will occur in the combustion chambers 6 and 7, whereas an expansion will occur in combustion chambers 8 and 9 until piston 3 releases the outlet slots 10 and piston 4 releases the outlet slots 13. When this occurs, the combustion gases in combustion chambers 8 and 9 escape through slots 10 and 13 and through the discharge connection 21 and 22 respectively, whereas at the same time fresh air from chambers 19 and 20 is pressed through inlet slots 14 and 17 into the combustion chambers 8 and 9 thereby scavenging the same. In the meantime, fuel is injected into combustion chambers 6 and 7 by the injection nozzles 36 and 37 whereby a combustion in said combustion chambers 6 and 7 will be initiated. Thereupon, pistons 3 and 4, and pistons 2 and 5 move again away from each other so that the gas in combustion chambers 6 and 7 will expand whereas the fresh air in the combustion chambers 8 and 9 will be compressed. When pistons 2 and 3 release the outlet slots 11 and 16 respectively, gas from the combustion chambers 6 and 7 will pass through outlet slots 11 and 16 respectively into chamber 18 and from here through discharge connection 23. After pistons 3 and 4 have respectively released inlet slots 12 and 15, fresh air from chamber 19 flows into combustion chambers 6 and 7 thereby initiating a new cycle.

With a cylinder having four combustion chambers, the crankshaft may be located in one plane which is parallel to the plane in which the axes of the two straight-line cylinder parts are located, for instance below and above the said plane. However, the crankshaft may also pass through and perpendicularly to the plane in which the axes of the two straight-line cylinder parts are located, and more specifically in the center between the said two straight-line cylinder parts, and may have a crank on each side of the said plane. In this instance, each of the said two cranks is connected through connecting rods with wrist pin-like extensions of the pistons with the latter in such a way that each crank is connected with two adjacent pistons.

While the cylinder of the arrangement according to FIGS. 1 and 2 has four combustion chambers, it is also possible to provide a cylinder with more than four combustion chambers in which instance the straight-line cylinder parts may have the shape of an equi-lateral triangle or of a square or another polygon in which instance the crankshaft extends perpendicularly through the plane formed by the cylinder. Also with a cylinder of this type having more than four combustion chambers, each of the combustion chambers may by means of piston-controlled slots be scavenged uni-directionally in the manner described in connection with FIGS. 1 and 2 and may correspondingly be supercharged.

More specifically, with reference to FIG. 3, the engine shown therein comprises three straight-line cylinder parts 1 each of which has reciprocally mounted therein two pistons 40, 41 and 42, 43 and 44, 45 respectively, said cylinder parts being interconnected by means of three corner combustion chambers 46, 47 and 48. The pistons of each pair of pistons confine therebetween a straight-line combustion chamber. Piston 40 is by means of a link 49 pivotally connected with a bell crank lever 50 tiltably journalled on a stationary pivot 51. Bell crank lever 50 is by means of a pivot 52 tiltably connected to a connecting rod 53 which is journalled on the intermediate crank of a crankshaft 54. According to the showing in FIG. 3, the connecting rod 53 and thereby piston 40 is shown in its upper dead center position. It will, however, be appreciated that this dead center position is merely the upper dead center position with regard to the combustion chamber 48, whereas it represents the lower dead center position with regard to the combustion chamber 1. Piston 41 is by means of a further link 49 pivotally connected to one end of a bell crank lever 55 tiltably journalled on a fixed stud 51, whereas the other end of the bell crank lever 55 is by means of a pivot tiltably connected to a connecting rod journalled on the same crank of the crankshaft as connecting rod 53, said last mentioned crank not being visible in FIG. 3 inasmuch as it is covered by the connecting rod 53. The respective longer lever arms of the bell crank levers 50 and 55 are slightly offset at the points 59 in order to allow the arrangement of the connecting rods 53 adjacent to the connecting rod not visible in the drawing. That respective arm of each bell crank lever which is connected to the respective link 49 is located in the plane of the cylinder axis. Piston 42 is through the intervention of a link 49 connected to a two-arm lever or bell crank lever comprising an arm 56 of a sleeve 57 journalled on a stationary pivot 51; said bell crank lever also comprises a second arm 58. The said sleeve 57 is necessary because arm 56 must be located in the plane in which the axis of the cylinder is located, whereas arm 58 is located in the plane of the third crank of the crankshaft. Arm 58 is, by means of a connecting rod 60, connected to a third crank of the crankshaft. Similarly, piston 43 is connected with the crankshaft through a link 49 and a bell crank lever 61 having two arms and a sleeve, and through a connecting rod which latter is covered by the connecting rod 60 and together with the latter is journalled on the third crank of the crank-shaft. Pistons 44 and 45 are in an analogous manner through further links 49 and bell crank levers 62 and 63 tiltably journalled on stationary studs 51 connected with two connecting rods which are journalled on the first crank of the crankshaft 54. Of these last mentioned two connecting rods, the connecting rod 64 is visible, whereas the other of said last mentioned two connecting rods is covered by the connecting rod 64.

*Operation of the arrangement of FIG. 3*

The arrangement of FIG. 3 operates in the following manner. When the gas pressure produced by a combustion in the corner combustion chambers 46, 47 and 48 moves the piston in the straight-line cylinder parts 1 toward each other, it will be evident that in view of the bell crank levers 50, 55 to 58, 61, 62 and 63, the connecting rods 53, 60 and 64 and the connecting rods on the respective same cranks of crankshaft 54 will be pushed in the direction toward their lower dead center points whereby the crankshaft 54 will rotate. At the same time, the charge in the straight line combustion chambers is compressed which combustion chambers are respectively confined between the pistons 40, 41 and 42, 43 and 44, 45. By injecting the fuel into the compressed charge, the combustion is initiated when the connecting rods have approximately reached their lower dead center points. As a result of the combustions in these combustion chambers, the pistons will be driven apart in the straight-line cylinder parts 1 and will together with the bell crank levers and connecting rods again be moved into the illustrated position while at the same time a compression will be effected in the corner combustion chambers 46, 47 and 48 until the entire cycle is repeated. Fuel injection nozzles 65 inject fuel into the corner combustion chambers 46, 47 and 48 and thereby initiate the combustions. The injection nozzles 66 supply those combustion chambers with fuel which in the straight-line cylinder parts 1 are confined by pistons 40 and 41, and 42, 43, and 44, 45.

Since with an engine having one or a plurality of cylinders of the above mentioned type each combustion chamber is confined by two pistons one controlling the inlet slots and the other one controlling the outlet slots, it is in conformity with the present invention possible for purposes of controlling the slots by said pistons for purposes of supercharging, to move the pistons at a certain phase displacement in such a way that each time the outlet slots will be released and closed prior to the inlet slots. If each piston is linked to a separate crankshaft crank, this displacement may be effected by a corresponding displacement of the cranks. By correspondingly coordinating the control functions, also two pistons may act upon one and the same crank. It is possible furthermore with two connecting rods acting on the same crankshaft crank, to link one connecting rod to the other one as auxiliary connecting rod in such a way that the pistons will carry out a suitable phase displacement. If this effect is not necessary under all circumstances, it is possible with a cylinder having four combustion chambers and two parallel straight-line cylinder parts to move the respective adjacent pistons uniformly. To this end, the pistons moving adjacent to each other may, for instance, by a rigid connecting element be located for instance in the plane defined by the axes of the two straight-line cylinder parts, to which rigid connecting element the bell crank lever may be linked as will be described later in connection with FIGS. 6 and 7. Preferably, the said connecting element is arranged adjacent the plane formed by the axes of the two straight-line cylinder parts in such a manner that the link forces exerted upon the pistons will have a minimum eccentricity. The rigid connecting element may also be designed U-shaped so that the slots in the cylinders will point downwardly or upwardly.

Such synchronous pistons have the advantage that the inertia forces of the pistons may be balanced better free from torques and, furthermore, the effective compression chamber below the cylinder head may be made smaller when both pistons simultaneously reach the outer dead center point.

Referring now to the arrangement in FIGS. 4 and 5, the engine illustrated therein partly in section comprises a cylinder with four combustion chambers and two straight-line parts parallel to each other, while the cylinder is designed similar to the cylinder of the engine described in connection with FIGS. 1 and 2. Accordingly, the two straight-line cylinder parts are designated with the reference numeral 1 and have slidably mounted therein four positions 66, 67, 68 and 69 respectively. Each of these pistons has a wrist pin-like extension 70. Connected to said wrist pin-like extension 70 are connecting rods 71, 72, 73 and 74 so that the connecting rod 71 connects piston 68 with the upper crank 75 of crankshaft 76. Furthermore, connecting rod 72 connects piston 69 likewise with the upper crank 75 of the crankshaft 76, whereas connecting rod 73 connects piston 66 with the lower crank 77 of crankshaft 76, and connecting rod 74 connects piston 67 with the lower crank 77 of crankshaft 76. The crankshaft 76 is provided with counterweights 78. The wrist pin-like extensions 70 extend through slots 79 in the walls of the straight-line cylinder parts 1. The outer marginal portions of the straight-line cylinder parts 1 are respectively provided with recesses 80 where the two straight-line cylinder parts 1 are closest to each other. The said recesses 80 extend in the manner of a passage to the other straight-line cylinder part 1 and thus increase the cross section of the outer compression chambers 81 and 82 through which the gases have to flow from the inlet slots 14 (not shown in the drawings) to the outlet slots 13 and from the inlet slots 17 to the outlet slots 10 respectively. Each of the two cylinder lids is so recessed that an approximately 8-shaped chamber is formed in which the two approximately circular head surfaces above the pistons, i.e. above the straight-line cylinder parts 1, are interconnected by a passage 86 into which extend the fuel injection nozzles 25. As a result thereof, the compression chamber is formed by approximately cylindrical parts confined by said head surfaces and the passage 86 as well as the passage 80. The injection nozzles 83 supply with fuel those combustion chambers which are confined by and between piston 67 and 68 and piston 66 and 69 respectively. The connecting chamber 84 establishes communication between the outlet slots 11 and 16, whereas the connecting chamber 85 supplies the inlet slots 12 and inlet slots 15 with fresh air.

Figure 4:
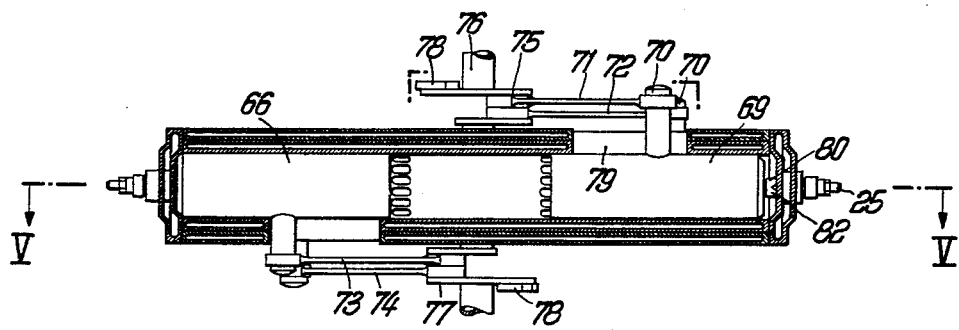
FIG. 4 is a vertical section through still another modification of an internal combustion engine of the invention.
Figure 5:
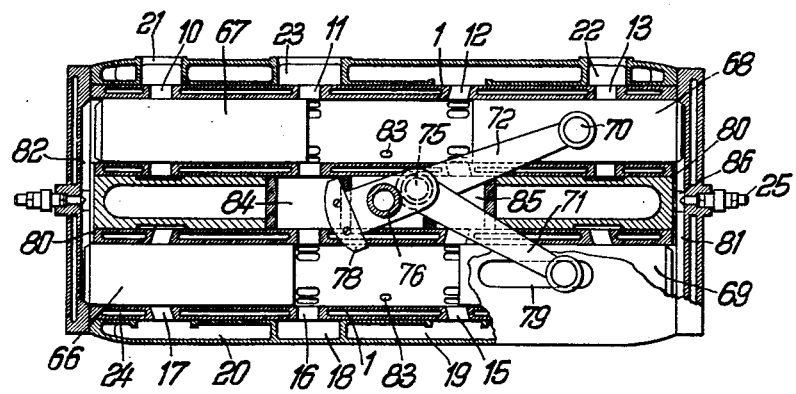
FIG. 5 is a section along the line V—V of FIG. 4.

*Operation of the arrangement of FIGS. 4 and 5*

The operation of the engine shown in FIGS. 4 and 5 is the same as that described in connection with FIGS. 1 and 2 as far as the piston movements and the combustions are concerned. In other words, the engines of FIGS. 1 and 2 on one hand and FIGS. 4 and 5 on the other hand differ from each other merely by the arrangement or design of the crank drive. If a plurality of such cylinders are arranged alongside each other in such a way that the wrist pin-like extensions 70 always rigidly interconnect two pistons of which each piston is located in one cylinder, the forces conveyed to the respective connecting rod will be effective substantially at the center so that also forces acting on the pistons in an effort to tilt or cant the same will be avoided. Transverse forces acting upon the pistons and resulting from the fact that the connecting rods are not located parallel to the respective piston axis, may with an appropriate design thereof be absorbed by the side walls of the slots 79. In particular, to this end, those parts of the wrist pin-like extension 70 which are located in the plane of the slots may be provided with slide shoes or plane sliding surfaces or a roller adapted to roll on the side walls of slots 79 may be coaxially journalled on said parts of the wrist pin-like extension 70.

Of the various possible arrangements for the slots in a cylinder with four combustion chambers and two parallel straight-line cylinder parts, that design has proved most favorable in which the two sides of one of the four pistons control the respective adjacent outlet slots of the two combustion chambers partly confined by the said one piston, whereas the two ends of the piston sliding at the opposite end of the other straight-line cylinder part control the inlet slots of the two combustion chambers partly confined by said last mentioned piston. As to the two remaining pistons, of which each one moves adjacent one of the two above mentioned pistons, one side of each of said two remaining pistons controls the inlet slots of a combustion chamber while the other side of each of said two remaining pistons controls the outlet slots of the other combustion chamber partly confined by the respective one of said two remaining pistons. Thus, only one piston has both sides thermally under high load while two pistons are under high thermal load on one side only, whereas one piston controls only the cool inlet slots. The adjacent slots of the two straight combustion chambers arranged adjacent each other have the same functions so that they can be surrounded by a single chamber common to both combustion chambers for the discharge of exhaust gases and the supply of fuel gases respectively. These two combustion chambers will also be scavenged in the same direction. If with such an arrangement of the slots, the two pistons one side of which controls the inlet slots while the other side controls the outlet slots, are operated so that they are offset with regard to each other by 180°, and if the piston, both sides of which control the outlet slots, moves ahead of the said two pistons offset to each other by 180°, and if the piston, both sides of which control the inlet slots, lags behind the said two offset pistons, all combustion chambers can be supercharged.

All of the pistons will be thermally loaded in the same manner if one side of each piston controls the inlet slots and the other side of each piston controls the outlet slots. However, in such an instance slots of opposite functions will be located adjacent each other in the two parallel cylinder sections. Similarly, all slots arranged adjacent each other, i.e. located in a plane perpendicular to the axes of the straight-line cylinder sections will have non-uniform functions if both sides of one piston control the outlet slots and the adjacent piston in the other straight-line cylinder sections controls inlet slots only. However, favorable conditions are obtained similar to those with the first mentioned arrangement if both sides of one piston control the outlet slots and the piston in the same straight-line cylinder section has both sides thereof control the inlet slots.

Referring now to FIGS. 6 and 7, these figures respectively illustrate in top view and side view an engine somewhat similar to that of FIGS. 4 and 5. The engine of FIGS. 6 and 7 differs from that of FIGS. 4 and 5 primarily in that the wrist pin-like extensions 70 of two pistons movable adjacent each other are interconnected by a rigid connecting member 88. In the central portion of connecting member 88 there is arranged a bolt 93 having journalled thereon a connecting rod 87. Connecting rod 87 connects the rigid connecting member 88 with the crank of the crankshaft 76. Due to the rigid connecting member 88, the two respective pistons 68 and 69 movable adjacent each other will reach their respective dead center positions at the same time.

It is, of course, to be understood that the present invention is, by no means, limited to the particular constructions shown in the drawings but also comprises any modifications within the scope of the appended claims.

What is claimed is:

1. In combination in an internal combustion engine: a cylinder body having a plurality of straight-line cylinder sections and also having a plurality of cylinder heads arranged at the ends of said straight-line sections and respectively common to two adjacent straight-line sections to respectively form outer combustion chambers at each end of the respective two adjacent straight-line sections, a plurality of pairs of oppositely movable double acting pistons, each of said straight-line cylinder sections having reciprocably mounted therein one of said pairs of oppositely movable double acting pistons in axial arrangement with each other, the inner ends of the pistons of each pair confining therebetween an inner combustion chamber, a crankshaft, and lever means operatively connecting said piston to said crankshaft, all of said combustion chambers having a stroke volume of the same magnitude.

2. In combination in an internal combustion engine: a cylinder body having two straight-line cylinder sections arranged alongside each other and in substantially parallel relationship to each other and also having a pair of cylinder heads respectively arranged at the ends of said straight-line sections, each of said cylinder heads forming an outer combustion chamber and establishing communication between the adjacent interior portions of said straight-line cylinder sections, two pairs of double acting pistons movable in opposite direction with regard to each other, each of said straight-line cylinder sections having reciprocably mounted therein one of said pairs of oppositely movable double acting pistons, the outer ends of the pistons of each pair of pistons respectively facing the respective adjacent outer combustion chamber, and the inner ends of each of said pairs confining with the straight-line cylinder wall portions therebetween an inner combustion chamber, a crankshaft, and lever means drivingly connecting all of said pistons with said crankshaft, all of said pistons having the same displacement.

3. In combination in an internal combustion engine: a substantially triangular cylinder body having three straight-line cylinder sections triangularly arranged with regard to each other and with the axes thereof located in substantially one and the same plane, said cylinder body also comprising three cylinder heads respectively arranged at the ends of said straight-line sections and interconnecting the same so as to establish communication between the respective adjacent interior portions of said straight-line cylinder sections, each of said cylinder heads forming with the adjacent cylinder portions an outer combustion chamber, three pairs of double acting pistons movable in opposite direction with regard to each other, each of said straight-line cylinder sections having one pair of said pairs of double acting pistons reciprocably mounted therein, the outer effective ends of the pistons of each pair of pistons respectively facing the respective adjacent cylinder head and the inner effective ends of each of said pairs of pistons confining with the straight-line cylinder wall portions therebetween an inner combustion chamber, a crankshaft extending substantially through the central portion of the triangle formed by said straight-line sections in a direction substantially perpendicular to said plane, three groups of link means, the link means of said groups respectively interconnecting the oppositely movable pistons of one straight-line cylinder section but each group interconnecting the pistons of a different straight-line section, and a plurality of lever means respectively drivingly connecting said groups of link means with said crankshaft.

References Cited in the file of this patent

UNITED STATES PATENTS

| | | |
|---|---|---|
| 639,686 | Parks | Dec. 19, 1899 |
| 1,338,256 | Sieverkropp | Apr. 27, 1920 |
| 1,557,395 | Augustine | Oct. 13, 1925 |
| 1,591,275 | Bronander | July 6, 1926 |
| 2,203,648 | Dons | June 4, 1940 |
| 2,388,756 | Meyers | Nov. 13, 1945 |